United States Patent [19]

Yanagisawa et al.

[11] 4,050,066
[45] Sept. 20, 1977

[54] BUZZER

[75] Inventors: Takeshi Yanagisawa; Motoyuki Osuga, both of Tokyo, Japan

[73] Assignee: Kabushiki Kaisha Seikosha, Japan

[21] Appl. No.: 730,085

[22] Filed: Oct. 6, 1976

[30] Foreign Application Priority Data

Oct. 9, 1975 Japan .............................. 50-121998

[51] Int. Cl.² .............................................. G01K 9/12
[52] U.S. Cl. ................................... 340/388; 340/396; 340/392
[58] Field of Search .............. 340/388, 392, 402, 400, 340/396

[56] References Cited

U.S. PATENT DOCUMENTS 3,950,744   4/1976   Stephens ........................... 340/388

Primary Examiner—Harold I. Pitts
Attorney, Agent, or Firm—Robert E. Burns; Emmanuel J. Lobato; Bruce L. Adams

[57] ABSTRACT

A buzzer comprises an annular magnet, a coil disposed at the inside of the magnet, a vibration plate disposed above said magnet, a core inserted into the central opening of said coil and with its one end facing said vibration plate, a case and a yoke. Said magnet said vibration plate and said yoke are held by the magnetic attraction of the magnet.

4 Claims, 2 Drawing Figures

BUZZER

BACKGROUND OF THE INVENTION

The present invention relates to a buzzer. Conventionally buzzer parts are assembled employing adhesive or by caulking. Therefore it was laborious to assemble with complex component parts.

SUMMARY OF THE INVENTION

According to a feature of the present invention there is provided a buzzer comprising, an annular magnet, a coil disposed at the inside of said magnet, a vibration plate disposed above said magnet, a core inserted into the central opening of said coil with its one end facing said vibration plate, a case, and a yoke, wherein said magnet, said vibration plate and said yoke are held one another by magnetic attraction of the magnet.

One object of the present invention is to provide a buzzer which can be easily assembled.

BRIEF DESCRIPTION OF THE DRAWINGS

The above object, other objects and characteristic features of the present invention will become evident and will be more readily understood from the following description and claims taken in conjunction with the accompanying drawings, in which;

DESCRIPTION OF PREFERRED EMBODIMENTS

Figure 1:
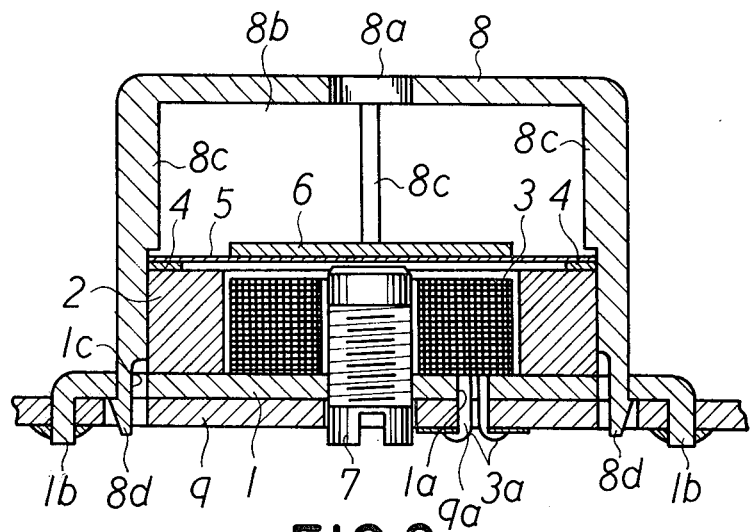
FIG. 1 is a vertical section of an embodiment according to the present invention.

Refering to FIG. 1, a yoke 1 is made of magnetic material such as iron, on which an annular magnet 2 is disposed. An annular coil 3 is concentrically disposed within the the magnet 2 and is secured to the yoke 1 by adhesive. A filmy vibration plate 5 is provided above the magnet 2 interposing a ring spacer 4 of magnetic material. On the upper surface of the vibration plate 5, a mass 6 is secured by means of spot welding or the like. The mass 6 is thicker than the vibration plate 5 and the outer diameter of which is equal to the inner diameter of said magnet 1. The vibration plate 5 has a predetermined spring constant, and is made of magnetic stainless steel in the present embodiment. The mass 6 is made of magnetic material such as SPCC and its size is suitably designed to adjust mass of the vibration system. In case the vibration plate 5 is made of magnetic material as in the present embodiment, the mass 6 can be dispensed with, provided that the vibration plate 5 has a larger thickness and reduced reluctance. The yoke 1, the magnet 2, the spacer 4 and the vibrator plate 5 are held one another only by the magnetic attraction of the magnet 2. A core 7 is screwed into the yoke 1 and is inserted to the central hole of the coil 3, thereby enabling control of the gap between the end surface of the core and the lower surface of the vibration plate 5. A casing 8 is fixed on the upper surface of the yoke 1 and is provided with a hole 8a at its upper central portion. The casing 8 defines a resonance chamber 8b above the vibration plate 5 for amplifying the sound caused by the vibration plate 5. A plurality of ribs 8c are formed on the inside of the casing 8 and their lower end portions are positioned just a little above the peripheral edge of the vibration plate 5. The casing 8 is fixed to the yoke 1 with its legs 8d snapped into holes 1c in the yoke. The buzzer is secured to a base plate 9 which serves as a circuit board as well, with the hooked portions 1b of the yoke 1 secured to this plate. The yoke 1 and the base plate 9 are respectively provided with small holes 1a, 9a in communication end to end through which leading wires 3a of the coil 3 are led to the base plate 9 and connected thereto by soldering. After the leading wires 3a are connected, adhesive is poured into the holes 1a, 9a so that inside air may not leak out.

Figure 2:
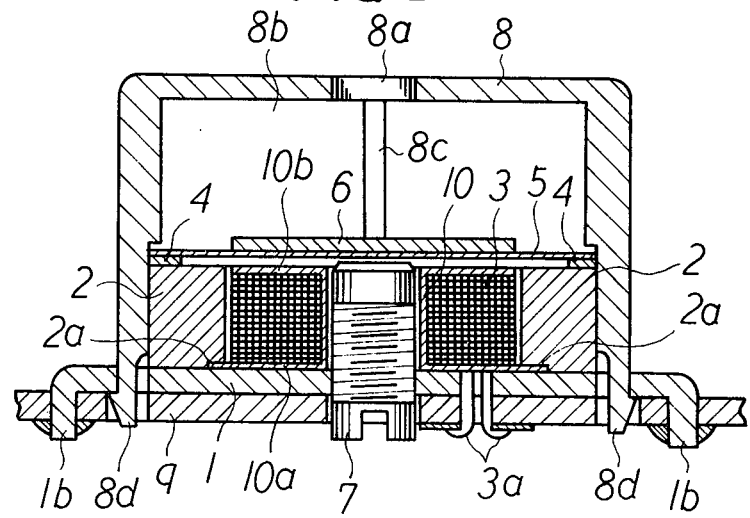
FIG. 2 is a vertical section of another embodiment according to the present invention.

Refering now to FIG. 2 another embodiment will be described.

A bobbin 10 is made of synthetic resin and around which a coil 3 is wound. The lower flange 10a is made larger than the upper flange 10b. The peripheral portion of the lower flange 10a is adapted to engage step portion 2a formed in the lower portion of the magnet 2 so as to prevent upward movement of the bobbin 10. Therefore it is not necessary to employ any adhesive. The other structure of FIG. 2 is substantially the same as the embodiment of FIG. 1 and part corresponding to that of FIG. 1 is given the same number.

Upon applying drive pulse signal to the coil 3, a looped magnetic path is formed through the core 7, the vibration plate 5, the mass 6, the spacer 4, the magnet 2 and the yoke 1. The magnetic flux density changes in accordance with the the polarity of the yoke 1, and the vibration plate 5 vibrates. The vibration sound is amplified resonantly in the resonance chamber 8b to produce louder output sound.

In each embodiment, a protruding portion may be formed integrally with the magnet 2 in stead of the spacer 4.

As described hereinabove, since the yoke, the magnet, the vibration plate are held one another by the magnetic attraction of the magnet, the buzzer is assembled simply by putting the magnet, the spacer, the vibration plate in order on the yoke.

What is claimed is:

1. A buzzer comprising; an annular magnet, a coil disposed at the inside of said magnet, a vibration plate disposed above said magnet, a core inserted into the central opening of said coil with its one end facing said vibration plate, yoke and a case, wherein said magnet, said vibration plate and said yoke are held one another by magnetic attraction of said magnet.

2. A buzzer according to claim 1, in which said case being provided with ribs on its inside for preventing removal of the vibration plate.

3. A buzzer comprising; an annular magnet, a coil wound about a bobbin disposed at the inside of said magnet, a vibration plate disposed above said magnet, a core inserted into the central opening of said coil with its one end facing said vibration plate, a yoke and a case, wherein said magnet, said vibration plate and said yoke are held one another by magnetic attraction of said magnet, and said magnet being provided with step portion for holding peripheral portion of a flange of said bobbin.

4. A buzzer according to claim 3, in which said case being provided with ribs on its inside for preventing removal of the vibration plate.

* * * * *